(12) United States Patent
Kuroki et al.

(10) Patent No.: US 7,113,849 B2
(45) Date of Patent: Sep. 26, 2006

(54) AMBULATION CONTROL APPARATUS AND AMBULATION CONTROL METHOD OF ROBOT

(75) Inventors: Yoshihiro Kuroki, Kanagawa (JP); Tatsuzo Ishida, Tokyo (JP); Jinichi Yamaguchi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 0 days.

(21) Appl. No.: 11/126,774

(22) Filed: May 11, 2005

(65) Prior Publication Data
US 2005/0203667 A1 Sep. 15, 2005

Related U.S. Application Data

(63) Continuation of application No. 10/637,890, filed on Aug. 8, 2003, which is a continuation of application No. 10/196,431, filed on Jul. 15, 2002, now Pat. No. 6,697,709, which is a continuation of application No. 09/663,991, filed on Sep. 18, 2000, now abandoned.

(30) Foreign Application Priority Data

Sep. 20, 1999 (JP) ................................ 11-266134
Jul. 7, 2000 (JP) ............................. 2000-206531

(51) Int. Cl.
*G06F 19/00* (2006.01)
(52) U.S. Cl. ...................... 700/245; 700/247; 700/248; 700/249; 700/258; 700/259; 318/568.1; 318/568.11; 318/568.12; 318/568.2; 901/1; 901/15; 901/47
(58) Field of Classification Search ................. 700/245
See application file for complete search history.

(56) References Cited

U.S. PATENT DOCUMENTS 5,459,659 A 10/1995 Takenaka (Continued)

OTHER PUBLICATIONS

J. Yamaguchi; E. Soga; S. Inoue; A. Takanishi (Waseda University): "Development of a Bipedal Humanoid Robot—Control Method of Whole Body Cooperative Dynamic Biped Walking" Proceedings of the International Conference on Robotics & Automation May 10-15, 1999 Detroit, Michigan, USA, Online! vol. 1, May 1999, pp. 368-374, XP002342104 Piscataway, NJ, USA ISBN: 0-7803-5180-0 Retrieved from the Internet: URL://http://ieeexplore.ieee.org/iel5/6243/16683/00770006.pdf?tp=&arnumber=770006&isnumber=16683> retrieved on Aug. 24, 2005!.

(Continued)

*Primary Examiner*—Thomas Black
*Assistant Examiner*—McDieunel Marc
(74) *Attorney, Agent, or Firm*—Frommer Lawrence & Haug LLP; William S. Frommer; Thomas F. Presson

(57) ABSTRACT

The stability of attitude of a robot can be recovered by an ambulation control apparatus and an ambulation control method according to the invention if it is lost in the course of a gesture for which the upper limbs take a major role. The apparatus and the method obtain the pattern of movement of the entire body for walking by deriving the pattern of movement of the loins from an arbitrarily selected pattern of movement of the feet, the trajectory of the ZMP, the pattern of movement of the trunk and that of the upper limbs. Therefore, according to the invention, a robot can determine the gait of the lower limbs so as to realize a stable walk regardless if the robot is standing upright or walking. Particularly, if the robot is made to gesture, using the upper body half including the upper limbs and the trunk while standing upright, it can determine the gait of the lower limbs so as to make a stable walk in response to such a gait of the upper body half.

7 Claims, 10 Drawing Sheets

U.S. PATENT DOCUMENTS

| | | | |
|---|---|---|---|
| 5,808,433 | A | 9/1998 | Tagami et al. |
| 5,872,893 | A | 2/1999 | Takenaka et al. |
| 5,936,367 | A | 8/1999 | Takenaka |
| 6,064,167 | A | 5/2000 | Takenaka et al. |
| 6,243,623 | B1 | 6/2001 | Takenaka et al. |
| 6,266,576 | B1 | 7/2001 | Okada et al. |
| 6,289,265 | B1 | 9/2001 | Takenaka et al. |
| 6,301,524 | B1 | 10/2001 | Takenaka |
| 6,317,652 | B1 | 11/2001 | Osada |
| 6,505,096 | B1 | 1/2003 | Takenaka et al. |
| 6,832,131 | B1* | 12/2004 | Hattori et al. ............... 700/245 |
| 6,832,132 | B1* | 12/2004 | Ishida et al. ................ 700/245 |
| 6,898,485 | B1* | 5/2005 | Kuroki et al. ............... 700/245 |
| 6,901,313 | B1* | 5/2005 | Mori et al. .................. 700/245 |
| 2002/0022907 | A1 | 2/2002 | Takenaka et al. |
| 2004/0162636 | A1* | 8/2004 | Hattori et al. ............... 700/245 |
| 2005/0033475 | A1* | 2/2005 | Kuroki et al. ............... 700/245 |
| 2005/0066397 | A1* | 3/2005 | Hidai et al. ..................... 901/1 |
| 2005/0125099 | A1* | 6/2005 | Mikami et al. ............. 700/245 |
| 2005/0151497 | A1* | 7/2005 | Nagasaka ............. 318/568.12 |

OTHER PUBLICATIONS

Hirai et al., The Development of Honda Humanoid Robot, 1998, IEEE, pp. 1321-1326.

Li et al., Learning Control, for a Biped Walking Robot with a Trunk, 1993, IEEE, pp. 1771-1777.

Yamaguchi et al., Development of Bipedal Humanoid Robot Having Antagonistic Driven Joints and Three DOF Trunk, 1998, IEEE, pp. 96-101.

Nihon Kikai Gakkai; The Japan Society of Mechanical Engineers, No. 97-31, Abstract of Presentation at Fifth "Control of Motion and Oscillation Symposium", Nov. 25, 1997 to Nov. 27, 1997, Hitachi.

Gienger et al., A Biped Robot that Jogs, 1000, IEEE, pp. 3334-3339.

Williams, Sony Unveils Prototype Humanoid Robot, 2000, Internet, pp. 1-4.

Pannu et al., Stability of a One Legged Robot Using U-Synthesis, 1995, IEEE, pp. 685-690.

Loffler et al., Control of a Biped Jogging Robot, 2000, IEEE, pp. 601-605.

LaBarca, Towards Robotic Bipedal Walking: An Experimental System for Designing Control Software for Dynamically Stable Robots, 1998, Internet.

Kennaway et al.,. Control of a Multi-legged Robot Based on Hierarchinal PCT, 1999, Perceptual Control Theory, pp. 1-7.

Pan et al., Study of Quadruped Walking Robot Climbing and Walking Down Slope, 1991, Internet/IEEE, pp. 1531-1534.

Fujimoto et al., Three Dimensional Digital Simulation and Autonomous Walking Control for Eight-axis Biped Robot, 1995, IEEE, pp. 2877-2884.

Shih, Analysis of the Dynamics of a Biped Robot with Seven Degree of Freedom, 1996, IEEE, pp. 3008-3282.

Marhefka et al., Gait Planning for Energy Efficiency in Walking Machines, 1997, IEEE, pp. 474-480.

Press Release, Sony Develops Small Biped Entertainment Robot, 2000, Internet, pp. 1-3.

* cited by examiner

100
HUMANOID ROBOT
(FRONT)

100
HUMANOID ROBOT
(BACK)

1 HEAD
2 NECK JOINT
3 UPPER ARM
4 FOREARM
5 SHOULDER JOINT
6 ELBOW JOINT
7 WRIST JOINT
8 HAND
9 TRUNK
10 TRUNK JOINT
11 HIP JOINT
12 THIGH
13 SHANK
14 KNEE JOINT
15 ANKLE JOINT
16 LEG
17 UPPER LIMB
18 LOINS
19 LOWER LIMB (LEG)

AMBULATION CONTROL APPARATUS AND AMBULATION CONTROL METHOD OF ROBOT

This application is a continuation of application Ser. No. 10/637,890, filed Aug. 8, 2003, which is a continuation of application Ser. No. 10/196,431, now pending, filed Jul. 15, 2002, now U.S. Pat. No. 6,697,709, which is a continuation of Application Ser. No. 09/663,991, filed Sep. 18, 2000, which is abandoned.

BACKGROUND OF THE INVENTION

1. Field of the Invention

This invention relates to an ambulation control apparatus and an ambulation control method to be used for a robot having a structure adapted to behave like a living body with an enhanced level of reality. More particularly, the present invention relates to an ambulation control apparatus and an ambulation control method to be used for a bipedal ambulatory robot having a structure that mimics the bodily mechanism and the motion of an erect bipedal animal such as man or ape.

To be more accurate, the present invention relates to an ambulation control apparatus and an ambulation control method to be used for a bipedal ambulatory robot adapted to erect bipedalism and having the upper half of the body including the torso, the head and the arms mounted on the lower limbs. More particularly, it relates to an ambulation control apparatus and an ambulation control method to be used for a robot that mimics the motion of man including gestures with startling reality and walks on its two legs without losing balance.

2. Description of Related Art

A robot refers to a mechanical apparatus that moves like man, utilizing electric and/or magnetic effects. The word "robot" is believed to be originating from a Slavic word "ROBOTA (slave machine)". Robots became popular in Japan in the late nineteen sixties but many of them were industrial robots designed for the purpose of automation and manpower-saving in factories including manipulators and carrier robots.

As a result of massive research and development efforts in recent years in the field of bipedal ambulatory robots having a structure that resembles the bodily mechanism and the motion of an erect bipedal animal such as man or ape, robots are expected than ever to find practical applications. The bipedal ambulatory robot adapted to erect bipedalism has an advantage that it can softly walk, getting over an obstacle and stepping up and down a staircase without difficulty.

It should be noted here, however, that the research and development of bipedal ambulatory robot historically started from studies on various aspects of motion of lower limbs and was not directed to entire erect bipeds.

For instance, Japanese Patent Application Laid-Open No. 3-184782 discloses a joint applicable to a structure corresponding to from-the-torso-down of a bipedal ambulatory robot.

Japanese Patent Application Laid-Open No. 5-305579 discloses an ambulation control apparatus of a bipedal ambulatory robot. An ambulation control apparatus according to the above patent document is adapted to control a bipedal ambulatory robot in such a way that the ZMP (zero moment point) of the robot on the floor where the robot is walking agrees with a target position. The zero moment point is a point on the floor where the moment of the robot due to the reaction of the floor is equal to nil. However, it is clear from FIG. 1 of the above patent document that the torso 24 that gives rise to the moment is a sort of black box and the document proposes only lower limbs of a bipedal ambulatory robot and not an entire robot that mimics man.

However, to many researchers, obviously the ultimate object of research and development of bipedal ambulatory robots is realization of a structure that looks like and moves like man. To be more accurate, a bipedal ambulatory robot is a structure adapted to erect bipedalims and having lower limbs good for walking on its two feet, an upper half of the body including a torso, a head and arms (hereinafter to be referred to simply as upper limbs) and a trunk section linking the upper limbs and the lower limbs. A complete robot should be so controlled that it stands upright and walks and works on its two feet, moving the upper limbs, the lower limbs and the trunk section in a coordinated manner according to a predetermined priority scheme.

A bipedal ambulatory robot that simulates man in terms of motion and bodily structure is referred to as humanoid robot. A humanoid robot can support our daily lives in various scenes of living.

Bipedal ambulatory robots can be roughly categorized into those to be used for industry and those to be used for entertainment.

Robots for industrial applications are mostly designed to replace men in various different industrial scenes and do difficult works for men in the field of manufacturing, construction, power generation and so on. For example, robots of this category replace men in atomic power plants, thermal power plants, petrochemical plants and other plants for maintenance works and in manufacturing factories and sky-scraping buildings for various dangerous and difficult works. Thus, robots of this category are so designed and manufactured as to operate for a specific application or function in a specific way, although they walk on two feet. In other words, they are not required to have a structure that mimics the bodily mechanism and the motion of an erect bipedal animal such as man or ape. For instance, while they may show high degrees of freedom at a specific part of the body in order to work for a specific application by moving in a delicate way, the degrees of freedom of other parts of the body that are not directly related to the application such as head and waist may be left low. As a result, inevitably, such robots may move awkwardly and may not appear particularly agreeable.

On the other hand, robots for entertainment are more closely related to our daily lives rather than adapted to carry out difficult works and supporting our lives. In other words, robots of this category are designed to copy the physical mechanism of erect bipedalism of men and apes and move smoothly. As they are a sort of copies of erect mammals such as men and apes who are highly intelligent, they are preferably rich in expressions. In this sense, they are exactly humanoid robots.

In short, while robots for entertainment share the essential technologies with those for industrial applications, they are totally different from each other in terms of hardware mechanism, method of controlling motions and software configuration for achieving the ultimate object.

As well known, the human body has joints whose number exceeds several hundreds and hence shows several hundred degrees of freedom. While a robot preferably shows the same degrees of freedom if it mimics perfectly the behaviour of man, to achieve such high degrees of freedom is technologically highly difficult because a single degree of freedom requires the use of an actuator but a robot provided with hundreds of actuators is totally impractical in terms of manufacturing cost, weight and size. Additionally, a robot with high degrees of freedom requires a volume of computation that increases exponentially for controlling the position, action and balance.

To summarize, a humanoid robot has to be designed to emulate the bodily mechanism of man with limited degrees of freedom. Additionally, a robot for entertainment is required to behave like man and be rich in expressions with degrees of freedom far lower than the human body.

Additionally, while a bipedal ambulatory robot adapted to erect bipedalism can softly walk, getting over an obstacle and stepping up and down a staircase without difficulty, the operation of controlling its attitude and walk is difficult because its center of gravity is rather high. Particularly, a robot for entertainment should be so controlled for its attitude and stable walk that it remains rich in expressions.

Meanwhile, the "expression" of man or ape heavily relies on the motion of the upper limbs including the arms and the torso in terms of not only carrying out a work but also manifesting its feeling. Such a motion is referred to as "gesture".

In our daily lives, gestures appear almost constantly on our bodies while we are standing or walking or otherwise moving on our feet. Additionally, the center of gravity of the entire body of a person moves significantly to give rise to the moment of inertia while he or she is gesturing. Men and apes are so created that they can keep on standing or walking by autonomously compensating the balance of the center of gravity and the moment of inertia.

On the other hand, a humanoid robot is required to be rich in expressions as pointed out above and hence gestures are indispensable to it. Therefore, the robot needs attitude control and stable walk control in response to a gesture for which the upper half of the body takes a major role.

A number of techniques have been proposed for controlling a bipedal ambulatory robot in terms of attitude and stable walk. However, most of the known techniques are those adapted to make the ZMP (zero moment point) of the robot where the moment of the robot due to the reaction of the floor is equal to nil agrees with a target position.

For example, Japanese Patent Application Laid-Open No. 5-305579 discloses a bipedal ambulatory robot that is controlled in such a way that the ZMP of the robot on the floor where the robot is walking agrees with a target position.

Additionally, the bipedal ambulatory robot of Japanese Patent Application Laid-Open No. 5-305581 is so configured that the ZMP is located in the inside of the supporting polyhedron or at a position separated from the ends of the supporting polyhedron of the robot by a predetermined margin when one of the feet of the robot touches down on or lifts off from the floor. With this arrangement, the robot can maintain its stability of walking if subjected to external disturbances because of its safety margin of a predetermined distance.

Japanese Patent Application Laid-Open No. 5-305583 also discloses a technique of controlling the walking speed of the bipedal ambulatory robot by way of ZMP target position. More specifically, the bipedal ambulatory robot of the above patent document uses preselected walk pattern data and the leg joints of the robot are so driven as to make the ZMP agree with a target position, while the inclination of the upper half of the body is detected, so that the rate of delivering the preselected walk pattern data is modified according to the detected value of inclination. As a result, if the robot rides on unexpected undulations of the floor and becomes forwardly inclined, the rate of delivering the preselected walk pattern data is raised to allow the robot to restore the proper attitude. Additionally, since the ZMP is so controlled as to agree with a target position, there arises no problem if the rate of delivering the preselected walk pattern data is modified when the robot is standing on its two feet.

Still additionally, the Japanese Patent Application Laid-Open No. 5-305585 discloses a technique of controlling the touch down position of either of the two feet of the bipedal ambulatory robot according to the target position of the ZMP. More specifically, the bipedal ambulatory robot of the above patent document either detects the discrepancy between the target position and the actually detected position of the ZMP and drives one or both of the legs to eliminate the discrepancy or detects the moment around the ZMP target position and drives the legs so as to make the detected moment equal to zero.

Furthermore, the Japanese Patent Application Laid-Open No. 5-305586 describes a technique of controlling the inclined attitude of the bipedal ambulatory robot by way of the ZMP target position. More specifically, the bipedal ambulatory robot of the above patent document detects the moment around the ZMP target position and, if any moment is detected, it drives the legs so as to make the detected moment equal to zero for stable walk.

Besides, known documents including "The Data Book of Bipedal Ambulatory Robots", (2nd edition), A General Study (A) Subsidized by the Ministry of Education, "A Study on Ambulation and Control of a Bipedal Ambulatory Robot", Research Group (February, 1986) and "The Development of a Bipedal Ambulatory Robot Adapted to Compensate the Tri-Axial Moment by a Motion of the Upper Limbs" (6th Symposium on Intelligent Moving Robots, May 21 and 22, 1992) describe bipedal ambulatory robots comprising at least upper limb joints for driving the upper limbs and a plurality of leg joints linked to the upper limbs and adapted to drive the leg joints for walking, wherein the gait of the upper limbs is determined on the basis of that of the lower limbs (and hence any instability of the attitude of the robot due to the motion of the legs is corrected by the gait of the upper limbs).

Thus, the above pointed out known techniques are not adapted to control the attitude and the stability of walking of the robot by taking motions where the upper limbs of the robot takes a major role into consideration. In other words, the above techniques are for recovering the stability of walking of a bipedal ambulatory robot by modifying the attitude of its upper limbs (and their motion that changes with time) when the robot can no longer keep on walking due to external disturbance. Differently stated, those techniques are intended to modify the attitude of the upper limbs of a robot where the lower limbs takes a major role in walking in order to correct their instability due to external disturbances so that the techniques neglect the expression of the upper limbs. Additionally, the techniques described in the above documents cannot recover the stability of attitude if it is lost in the course of a gesture for which the upper limbs take a major role.

In view of the above pointed out technological problems, it is therefore an object of the present invention to provide an ambulation control apparatus and an ambulation control method for effectively controlling a robot having a structure that is adapted to mimic the mechanism and the behaviour of a living body.

Another object of the present invention is to provide an ambulation control apparatus and an ambulation control method for effectively controlling a bipedal ambulatory robot having a structure that is adapted to mimic the mechanism and the behaviour of an erect biped such as man or ape.

Still another object of the present invention is to provide an ambulation control apparatus and an ambulation control method for effectively controlling an erect bipedal ambulatory robot having lower limbs adapted to erect bipedalism and amounted with an upper body half including a torso, a head and arms.

Still another object of the present invention is to provide an ambulation control apparatus and an ambulation control method for effectively controlling a robot so as to make it walk stably and keep on behaving like a man and being rich in expressions.

A further object of the present invention is to provide an ambulation control apparatus and an ambulation control method for effectively controlling an erect bipedal ambulatory robot having lower limbs adapted to erect bipedalism and amounted with an upper body half including a torso, a head and arms so as to make it recover the stability of attitude whenever the latter is lost due to an action of gesture or some other expression where the upper body half takes a major role.

A still further object of the present invention is to provide an ambulation control apparatus and an ambulation control method for effectively controlling an erect bipedal ambulatory robot so as to make it determine its gait of the lower limbs in response to that of the upper limbs (the term "gait" as used herein is a technical term of the industry referring to "time series changes of the angles of joints" and having a meaning substantially same as "pattern of movement").

BRIEF SUMMARY OF THE INVENTION

According to the invention, the above objects are achieved by providing an ambulation control apparatus or an ambulation control method for controlling a robot of the type having at least lower limbs, a trunk and loins and adapted to bipedalism, said apparatus or method being adapted to obtain the pattern of movement of the entire body for walking by deriving the pattern of movement of the loins from an arbitrarily selected pattern of movement of the feet, the trajectory of the ZMP, the pattern of movement of the trunk and that of the upper limbs.

In a second aspect of the invention, there is also provided an ambulation control apparatus or an ambulation control method for controlling a robot of the type having at least lower limbs, a trunk and loins so as to make it move on its two feet of the lower limbs in order to cause the ZMP to get to a target position, said apparatus or method comprising:

(a) a means for or a step of selecting the motion of the feet, that of the trunk and that of the upper limbs and the attitude and height of the loins in order to realize a requested action;

(b) a means for or a step of selecting the trajectory of the ZMP on the basis of the motion of the feet selected by said means or in said step (a);

(c) a means for or a step of obtaining a solution for the motion of the loins for balancing the moment on the ZMP selected by said means or in said step (b); and (d) a means for or a step of realizing the motion of the loins on the basis of the obtained solution for the motion of the loins.

In a third aspect of the invention, there is also provided an ambulation control apparatus or an ambulation control method for controlling a robot of the type having at least lower limbs, a trunk and loins so as to make it move on its two feet of the lower limbs in order to cause the ZMP to get to a target position, said apparatus or method comprising:

(A) a means for or a step of selecting the motion of the feet, that of the trunk and that of the upper limbs and the attitude and height of the loins in order to realize a requested action;

(B) a means for or a step of selecting the trajectory of the ZMP on the basis of the motion of the feet selected by said means or in said step (A);

(C) a means for or a step of obtaining an approximate solution for the motion of the loins for balancing the moment on the ZMP selected by said means or in said step (B) by means of a non-strict model;

(D) a means for or a step of obtaining an approximate solution for the motion of the loins for balancing the moment on the ZMP selected by said means or in said step (B) by means of a non-strict model;

(E) a means for or a step of finalizing the solution for the motion of the loins when the difference between the approximate solution obtained by said means or in said step (C) and the approximate solution obtained by said means or in said step (D) is less than a predetermined admissible value;

(F) a means for or a step of modifying the moment on the ZMP of the non-strict model and inputting the modified value to said means or step (C) when the difference between the approximate solution obtained by said means or in said step (C) and the approximate solution obtained by said means or in said step (D) is not less than the predetermined admissible value; and (G) a means for or a step of realizing the motion of the loins on the basis of the obtained solution for the motion of the loins.

For the purpose of the invention, the non-strict model in an ambulation control apparatus or an ambulation control method according to the third aspect of the invention may be a linear and/or non-interference multiple material point approximation model for robots. On the other hand, the strict model in an ambulation control apparatus or an ambulation control method according to the third aspect of the invention may be a rigid body model or a non-linear and/or interference approximation model of a multiple material point system.

An ambulation control apparatus or an ambulation control method according to the third aspect of the invention may further comprises (C') a means for or a step of reselecting/modifying the pattern of movement of the trunk and that of the upper limbs when the selected motion of the trunk and that of the upper limbs cannot be realized by the approximate solution obtained by said means for or in said step of, whichever appropriate, obtaining an approximate solution for the motion of the loins by means of a non-strict model (C).

For the purpose of the invention, said means for or said step of obtaining an approximate solution for the motion of the loins by means of a non-strict model (C) of an ambulation control apparatus or an ambulation control method according to the third aspect of the invention may be a means for or a step of, whichever appropriate, obtaining an approximate solution for the motion of the loins by solving a balancing equation of the moment on the selected ZMP generated by the motions of the feet, the trunk and the upper limbs and the moment on the selected ZMP generated by the horizontal plane motion of the loins.

Alternatively, said means for or said step of obtaining an approximate solution for the motion of the loins by means of a non-strict model (C) may be a means for or a step of, whichever appropriate, replacing the time function with a frequency function for computation.

Still alternatively, said means for or said step of obtaining an approximate solution for the motion of the loins by means of a non-strict model (C) may be a means for or a step of, whichever appropriate, computationally determining the Fourier coefficients of the horizontal plane trajectory of the loins by applying a Fourier series development to the moment on the selected ZMP generated by the motions of the feet, the trunk and the upper limbs and also to the horizontal plane trajectory of the loins and additionally obtaining an approximate solution of the motion of the loins by applying an inverse Fourier series development.

In a fourth aspect of the invention, there is also provided an ambulation control apparatus or an ambulation control method for controlling a robot of the type having an upper body half provided with a plurality of joints for expressing an action of the upper body half and a lower body half having leg joints at least for realizing an ambulatory action, the gait of the lower body half adapted to stable walk being determined according to the gait of the upper body half.

Thus, an ambulation control apparatus or an ambulation control method according to the invention can realize the motion of the loins of a robot adapted to stable walk on the basis of a selected pattern of movement of the trunk and that of the upper limbs in addition to that of the feet. The motion of the trunk and that of the upper limbs correspond to the gait of the upper body half that is an action of expression including gestures that uses the upper body half.

Therefore, according to the invention, a robot can determine the gait of the lower limbs so as to realize a stable walk regardless if the robot is standing upright or walking. Particularly, if the robot is made to gesture, using the upper body half including the upper limbs and the trunk while standing upright, it can determine the gait of the lower limbs so as to make a stable walk in response to such a gait of the upper body half.

According to the invention, there is provided an ambulation control apparatus and an ambulation control method for effectively controlling a robot having a structure that is adapted to mimic the mechanism and the behaviour of a living body.

Additionally, according to the present invention, there is also provided an ambulation control apparatus and an ambulation control method for effectively controlling a bipedal ambulatory robot having a structure that is adapted to mimic the mechanism and the behaviour of an erect biped such as man or ape.

Still additionally, according to the present invention, there is also provided an ambulation control apparatus and an ambulation control method for effectively controlling an erect bipedal ambulatory robot having lower limbs adapted to erect bipedalism and amounted with an upper body half including a torso, a head and arms.

Still additionally, according to the present invention, there is also provided an ambulation control apparatus and an ambulation control method for effectively controlling a robot so as to make it walk stably and keep on behaving like a man and being rich in expressions.

Still additionally, according to the present invention, there is also provided an ambulation control apparatus and an ambulation control method for effectively controlling an erect bipedal ambulatory robot having lower limbs adapted to erect bipedalism and amounted with an upper body half including a torso, a head and arms so as to make it recover the stability of attitude whenever the latter is lost due to an action of gesture or some other expression where the upper half of the body takes a major role.

Furthermore, according to the present invention, it is now possible to provide a robot adapted to erect bipedalism and designed to generate a pattern of movement of the loins to generate a corresponding pattern of stable motion of the lower half of the body which may be from-the-trunk-down (or from-the-loins-down). Therefore, if the attitudinal stability of the robot is lost due to an expression such as gesture led by the upper body half, it can be recovered by an appropriate motion of the lower half of the body.

In the case of a bipedal ambulatory robot having six degrees of freedom at each lower limb, the attitude of each leg is unequivocally determined by the position of the corresponding foot and the height of the corresponding loin. In other words, the generation of a pattern of movement of the loin means that the attitude of the leg and hence the gait of the lower limb is determined by it. Thus, with an ambulation control apparatus or an ambulation control method according to the invention, it is possible to determine the gait of the lower body half that is adapted to stable bipedalism in response to the gait of the upper body half.

DETAILED DESCRIPTION OF THE INVENTION

Now, the present invention will be described in greater detail by referring to the accompanying drawings that illustrate preferred embodiments of the invention.

Figure 1:
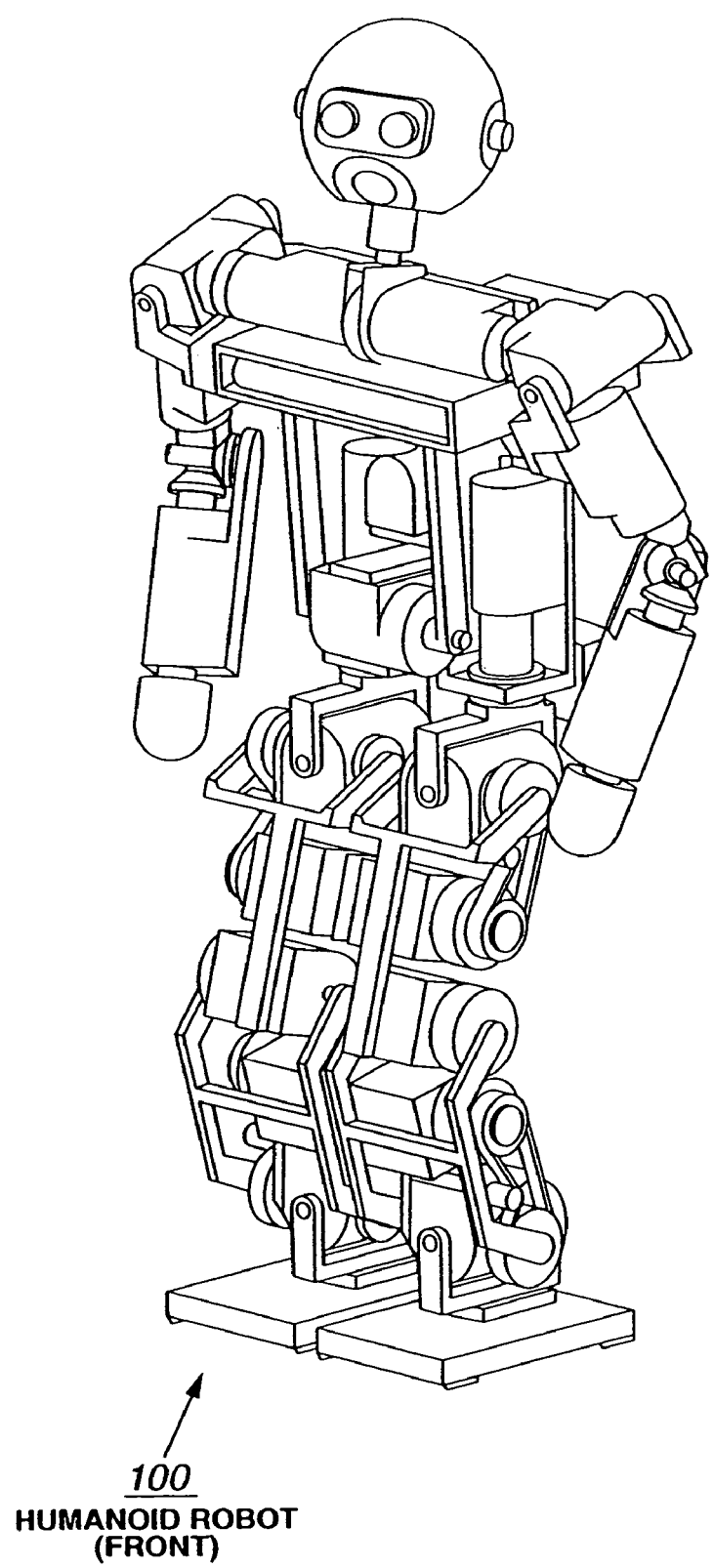
FIG. 1 is a schematic perspective front view of a humanoid robot 100 to which the present invention is applicable.
Figure 2:
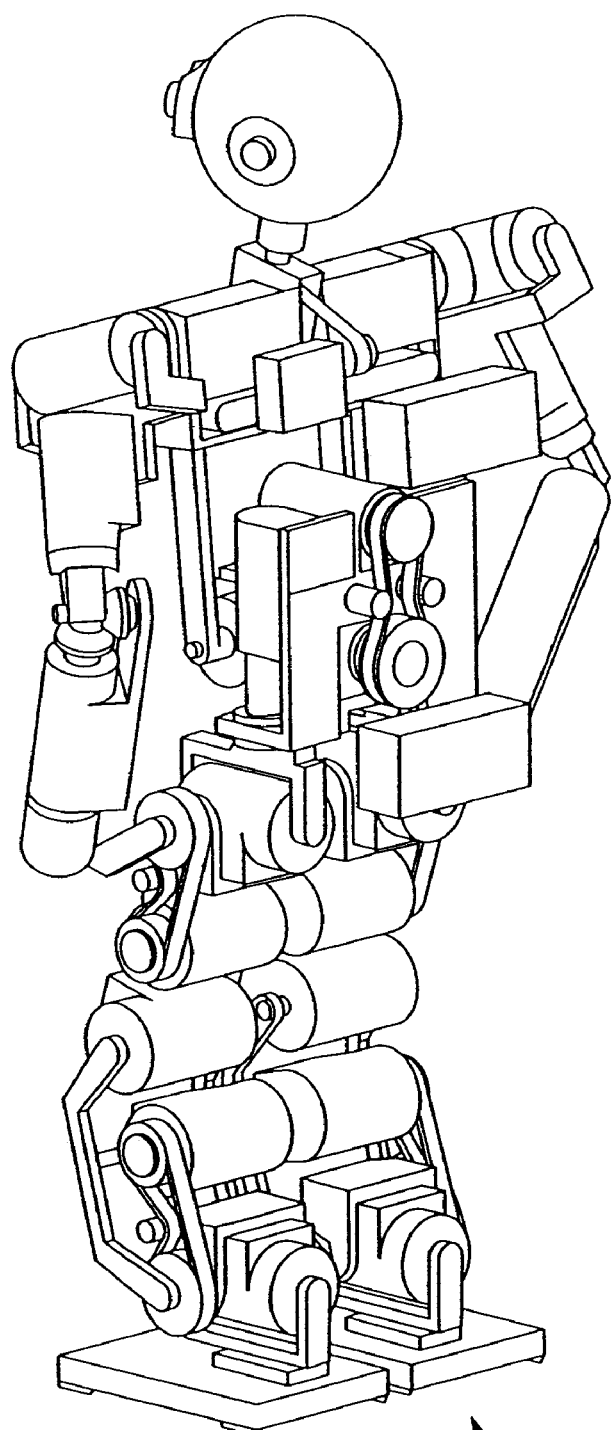
FIG. 2 is a schematic perspective rear view of the humanoid robot of FIG. 1.
Figure 3:
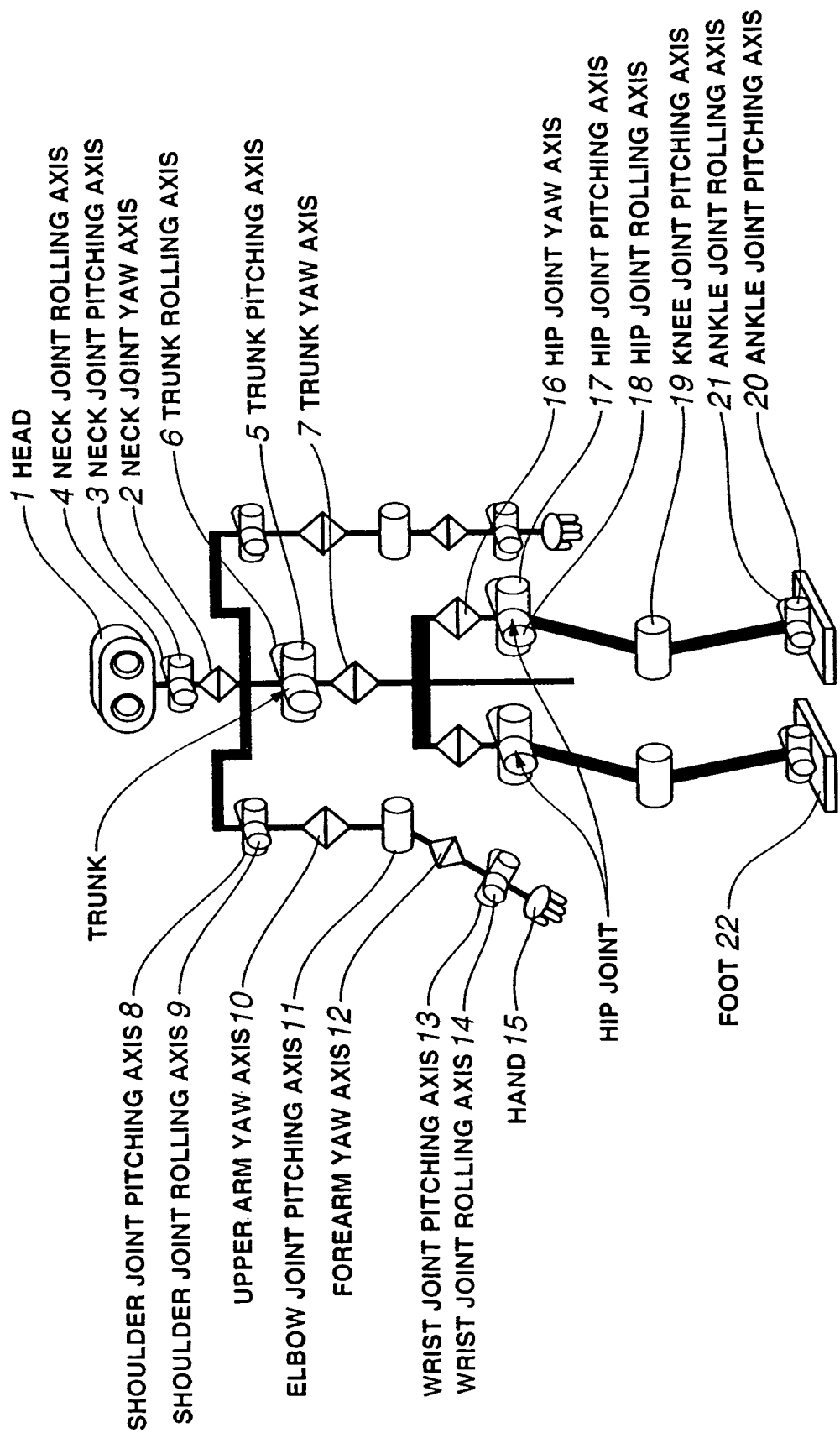
FIG. 3 is a schematic illustration of the humanoid robot 100 of FIG. 1, showing the model of degrees of freedom applied to it.

FIGS. 1 and 2 are schematic perspective view of a humanoid robot 100 to which the present invention is applicable, illustrating a front view and a rear view respectively. FIG. 3 is a schematic illustration of the humanoid robot 100 of FIG. 1, showing the model of degrees of freedom applied to it.

As shown in FIG. 3, the humanoid robot 100 comprises body half including a pair of arms and a head 1, a lower body half including a pair of legs for realizing a walking action and a trunk linking the upper limbs and lower limbs.

The neck joint supporting the head 1 has three degrees of freedom of a neck joint yawing axis 2, a neck joint pitching axis 3 and a neck joint rolling axis 4.

Each of the upper limbs comprises a shoulder joint pitching axis 8, a shoulder joint rolling axis 9, an upper arm yawing axis 10, an elbow joint pitching axis 11, a forearm yawing axis 12, a wrist joint pitching axis 13, a wrist joint rolling axis 14 and a hand 15. The hand 15 of man is in fact a multiple joint and multiple degree of freedom structure having a plurality of fingers. However, since the action of the hand 15 exerts little effect on the attitude control and the ambulation control of the robot 100, it is assumed here to have zero degrees of freedom. Thus, each of the upper limbs has seven degrees of freedom.

The trunk has three degrees of freedom of a trunk pitching axis 5, a trunk rolling axis 6 and a trunk yawing axis 7.

Each of the lower limbs comprises a hip joint yawing axis 16, a hip joint pitching axis 17, a hip joint rolling axis 18, a knee joint pitching axis 19, an ankle joint pitching axis 20, an ankle joint rolling axis 21 and a foot 22. For the purpose of this invention, the point of intersection of the hip joint pitching axis 17 and the hip joint rolling axis 18 defines the position of the hip joint. While the foot 22 of man is in fact a multiple joint and multiple degree of freedom structure including a sole, the sole of the humanoid robot 100 has zero degrees of freedom for the purpose of the invention. Thus, each of the lower limbs has six degrees of freedom.

All in all, the humanoid robot 100 of this embodiment has a total of 3+7×2+3+6×2=32 (thirty two) degrees of freedom. However, note that the degrees of freedom of humanoid robots 100 designed for the purpose of entertainment are by no means not limited to thirty two. It may be needless to say that the degrees of freedom and hence the number of joints of a robot should be determined appropriately depending on various limitations and requirements particularly in terms of design and manufacture.

The degrees of freedom of the humanoid robot 100 are realized in reality by so many actuators mounted on the robot. The actuators are preferably small and lightweight from the viewpoint that the robot is an unstable bipedal structure, requiring rigorous attitude control, although it looks like and behave like a man. For the purpose of this embodiment, small AC servo actuators of the type where the gears are directly linked and the servo control system is realized in the form a single chip that is contained in a motor unit. Note that such an AC servo actuator is known and described, for example, in Japanese Patent Application Laid-Open No. 11-33386, which is assigned to the applicant of the present patent application.

Figure 4:
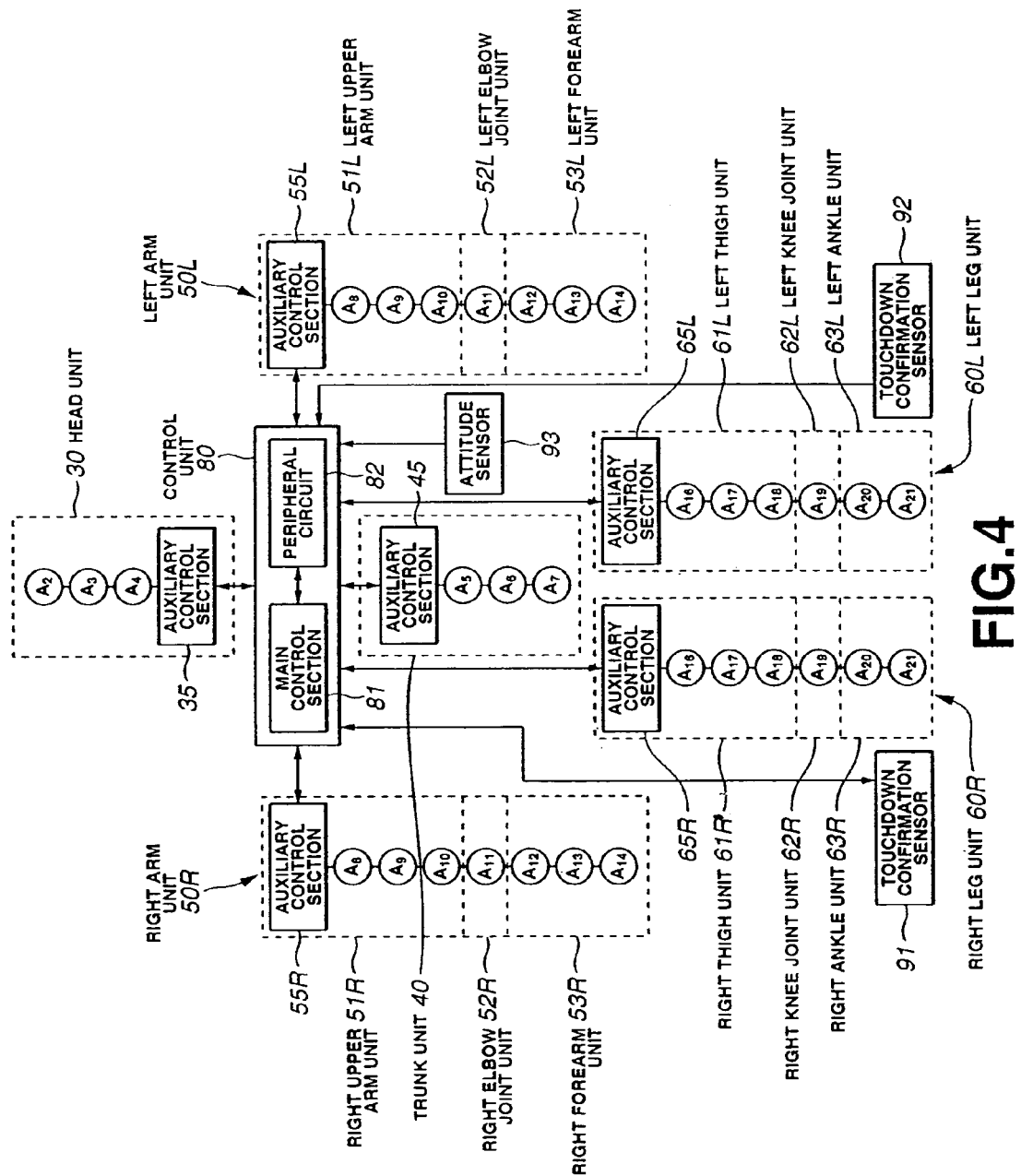
FIG. 4 is a schematic illustration of a humanoid robot 100 to which the present invention is applicable, showing the control system thereof.

FIG. 4 is a schematic illustration of a humanoid robot 100 to which the present invention is applicable, showing the control system thereof. As shown, the humanoid robot 100 comprises mechanical units 30, 40, 50R/L and 60R/L that correspond to respective parts of the human body and a control unit 80 for controlling the motions of the mechanical units in a coordinated manner (R and L being suffixes for indicating right and left respectively as used herein).

The entire motion of the humanoid robot 100 is controlled by the control unit 80. The control unit 80 comprises a main control unit 81 containing a CPU (central processing unit), memories and other major circuit components (not shown) and a peripheral circuit 82 containing a power source circuit (not shown) and interfaces (not shown) to be used for the exchange of data and command between related circuit components.

For the purpose of the invention, the control unit 80 may be installed at any appropriate position. While it is mounted in the trunk unit 40 in FIG. 4, it may alternatively be mounted in the head unit 30. Still alternatively, the control unit 80 may be arranged outside the robot 100 so that it may communicate with the robot 100 main body by way of a wired or radio communication channel.

The degrees of freedom of each of the joints of the robot 100 shown in FIG. 3 are realized by so many corresponding actuators. More specifically, the head unit 30 is provided with a neck joint yawing axis actuator $A_2$, a neck joint pitching axis actuator $A_3$ and a neck joint rolling axis actuator $A_4$ respectively for the neck joint yawing axis 2, the neck joint pitching axis 3 and the neck joint rolling axis 4.

On the other hand, the trunk unit 40 is provided with a trunk pitching axis actuator $A_5$, a trunk rolling axis actuator $A_6$ and trunk yawing axis actuator $A_7$ respectively for the trunk pitching axis 5, the trunk rolling axis 6 and the trunk yawing axis 7.

Meanwhile, each of the arm units 50R/L that comprise upper arm units 51R/L, elbow joint units 52R/L and forearm unit 53R/L is provided with a shoulder joint pitching axis actuator $A_8$, a shoulder joint rolling axis actuator $A_9$, an upper arm yawing axis actuator $A_{10}$, an elbow joint pitching axis actuator $A_{11}$, an elbow joint rolling axis actuator $A_{12}$, a wrist joint pitching axis actuator $A_{13}$ and a wrist joint rolling axis actuator $A_{14}$ respectively for the shoulder joint pitching axis 8, the shoulder joint rolling axis 9, the upper arm yawing axis 10, the elbow joint pitching axis 11, the elbow joint rolling axis 12, the wrist joint pitching axis 13 and the wrist joint rolling axis 14.

Each of the leg units 60R/L that comprise thigh units 61R/L, knee units 62R/L and shank units 63R/L is provided with a hip joint yawing axis actuator $A_{16}$, a hip joint pitching axis actuator $A_{17}$, a hip joint rolling axis actuator $A_{18}$, a knee joint pitching axis actuator $A_{19}$, an ankle joint pitching axis actuator $A_{20}$ and an ankle joint rolling axis actuator $A_{21}$, respectively for the hip joint yawing axis 16, the hip joint pitching axis 17, the hip joint rolling axis 18, the knee joint pitching axis 19, the ankle joint pitching axis 20 and the ankle joint rolling axis 21.

The actuators $A_2, A_3, \ldots$ provided for the respective joints are preferably small AC servo actuators of the type where the gears are directly linked and the servo control system is realized in the form a single chip that is contained in a motor unit.

The mechanical units including the head unit 30, the trunk unit 40, the arm units 50R/L and the leg units 60R/L are provided with respective auxiliary control sections 35, 45, 55R/L and 65R/L for driving/controlling the actuators for which they are responsible. The robot is additionally provided with touch down confirmation sensors 91 and 92 for detecting the if either or both of the soles of the right and left leg units 60R/L touched down or not and an attitude sensor 93 is arranged in the trunk unit 40 to detect the attitude of the robot.

The main control section 80 appropriately controls the auxiliary control sections 35, 45, 55 and 65 in response to the outputs of the sensors 91 through 93 to cause the humanoid robot 100 to move its upper limbs, trunk and lower limbs in a concerted manner. The main control section 81 selects the motion of the feet, the trajectory of the ZMP (zero moment point), the motion of the trunk, that of the upper limbs and the height of the loins and transfers commands necessary for the selected motions to the auxiliary control sections 35, 45, 55 and 65. Upon receiving the commands, the auxiliary control sections output drive control signals to the respective actuators $A_2, A_3, \ldots$ in response to the commands they receives from the main control section 81. The term "ZMP" as used herein refers to a point on the floor where the moment of the robot due to the reaction of the floor is equal to nil. The expression "ZMP trajectory" as used herein refers to the trajectory along which the ZMP moves while the robot 100 is walking.

With this embodiment, the humanoid robot 100 physically having the degrees of freedom as shown in FIG. 3 is replaced by a multiple material point approximation model to computationally control the ambulation of the robot. While the humanoid robot 100 is an aggregate of infinite continuous material points, the volume of computations necessary for controlling the ambulation of the robot can be reduced by replacing it with an approximation model comprising finite and discrete material points.

Figure 5:
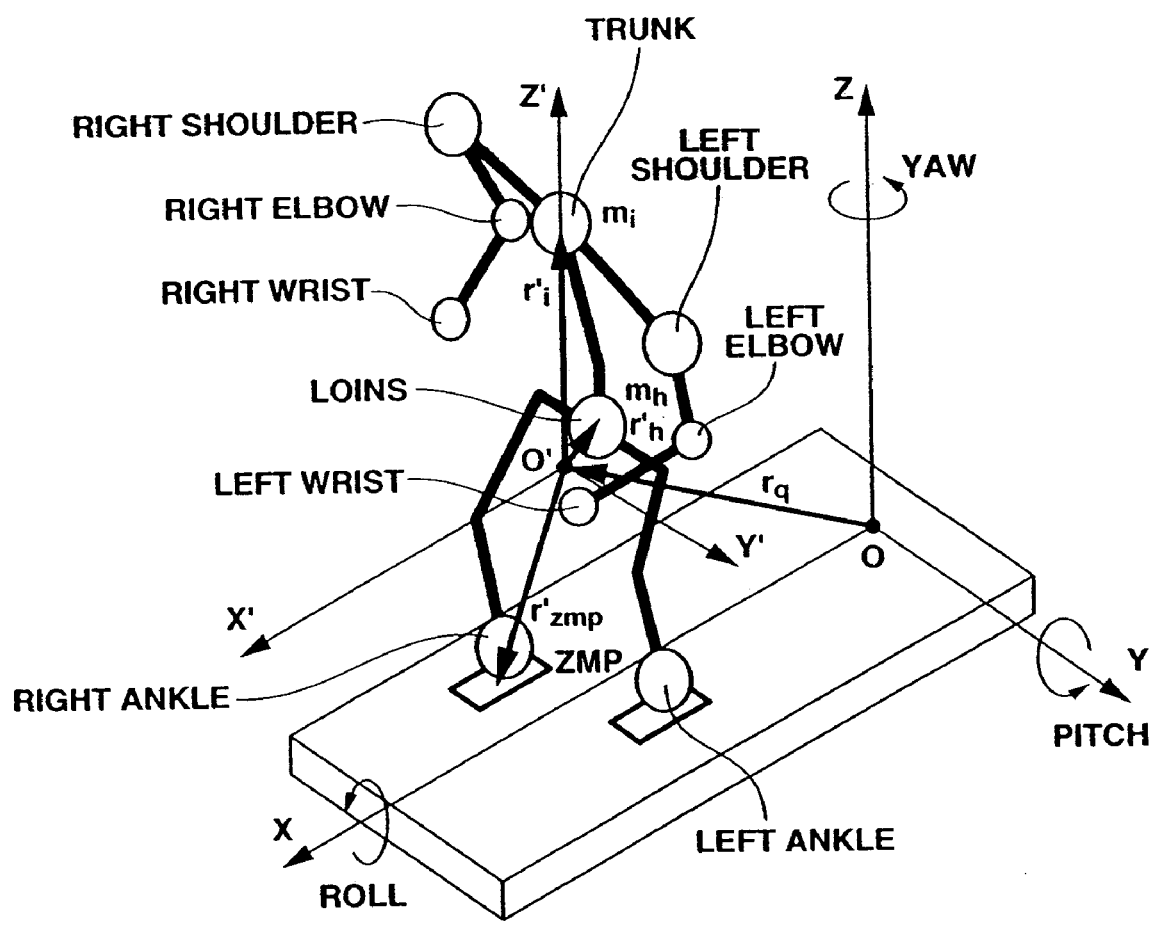
FIG. 5 is a schematic illustration of the linear and non-interference multiple material point approximation model applied to a humanoid robot 100 in order to control the walk thereof.

FIG. 5 is a schematic illustration of the linear and non-interference multiple material point approximation model applied to a humanoid robot 100 in order to control the walk thereof for the purpose of this embodiment.

Referring to FIG. 5, the O-XYZ coordinate system shows the axes of rolling, pitching and yawing in the absolute coordinate system, whereas the O'-X'Y'Z' coordinate system shows the axes of rolling, pitching and yawing in the moving coordinate system that moves with the robot 100. In the case of the multiple material point model of FIG. 5, i denotes the i-th material point. Therefore, mi denote the mass of the i-th material point and $r'_i$ denotes the position vector of the i-th material point (in the moving coordinate system). The mass of the material point of the loins that is important for controlling the motion of the loins as will be discussed hereinafter is denoted by $m_h$ and its position vector is denoted by $r'_h$ ($r'_{hx}, r'_{hy}, r'_{hz}$), whereas the position vector of the ZMP is denoted by $r'_{zmp}$.

In the case of the non-strict multiple material point approximation model of FIG. 5, the formula of moment is described in the form of linear equation and hence does not interfere with the pitching axis and the rolling axis.

Such a multiple material point approximation model can be generated in a manner as generally described below.

(1) Determine the mass distribution of the entire robot 100.

(2) Select material points. Material points may be selected manually according to the inputs of the designer or automatically according to a predetermined rule.

(3) Determine the center of gravity of each region (material point) i and assign the center of gravity and the mass $m_i$ to the material point.

(4) Express each material point $m_i$ as a sphere having its center at the material point $r_i$ and its radius proportional to its mass.

(5) Link the spheres, or the material points, that are linked in reality.

A multiple material point model represents the robot in the form of a wireframe model. In the multiple material point approximation model of FIG. 5, the shoulders, the elbows, the wrists, the trunk, the loins and the ankles are selected as magnetic tape points.

Figure 8:
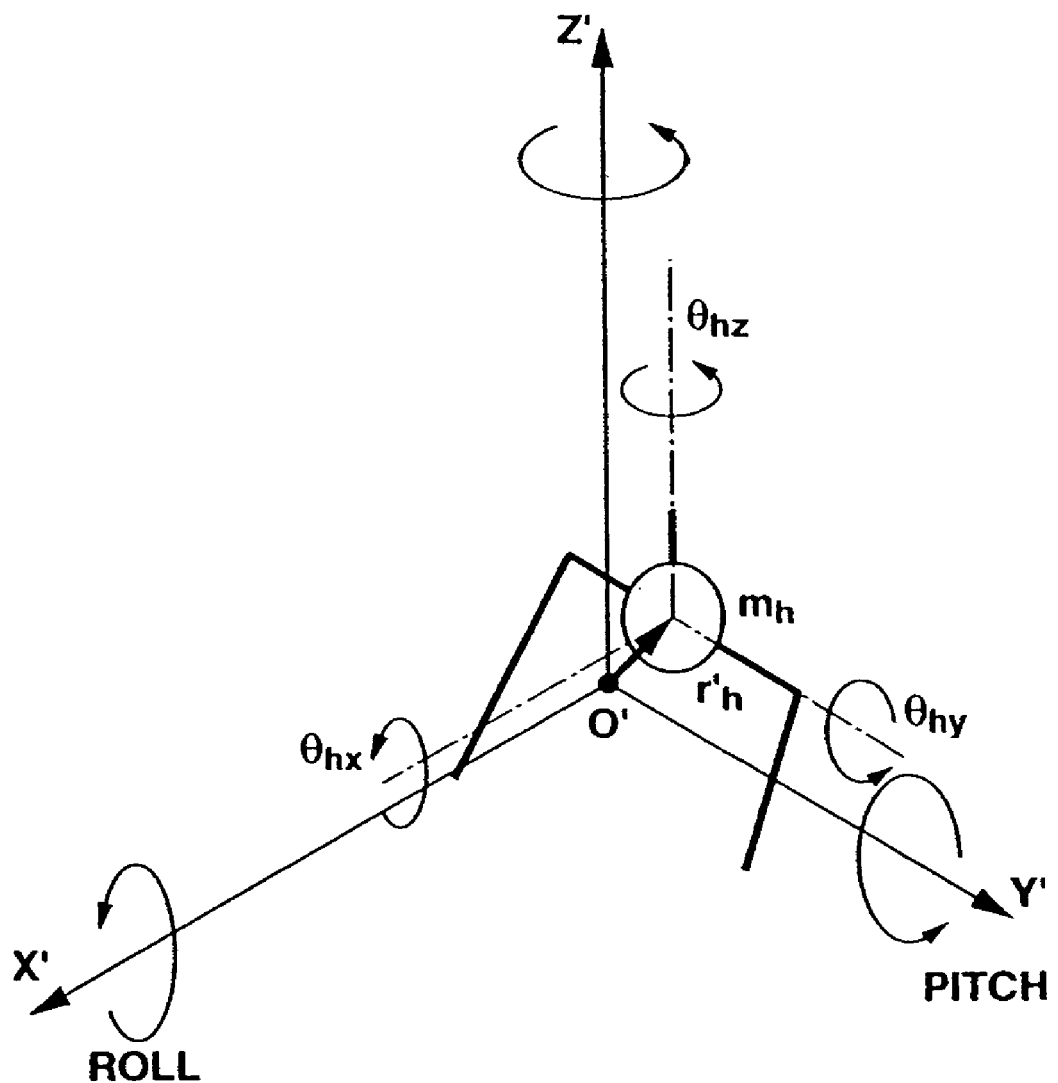
FIG. 8 is an enlarged schematic perspective view of the multiple material point model of FIG. 5, illustrating the loins and the vicinity thereof.

The angles of rotation ($\theta_{hx}, \theta_{hy}, \theta_{hz}$) in the loins information of the multiple material point approximation model of FIG. 5 define the attitude of the loins of the humanoid robot 100 in terms of rolling axis, pitching axis and yawing axis (see FIG. 8 that is an enlarged schematic perspective view of the multiple material point model of FIG. 5, illustrating the loins and the vicinity thereof).

Now, the operation of control the ambulation of the humanoid robot 100 of this embodiment will be discussed below.

A robot is normally so designed that its joints, or the actuators, are driven in a controlled manner according to a motion pattern generated in advance before it actually move. In the case of the robot 100 of this embodiment, a loins motion pattern that allows the robot to stably walk is generated on the basis of a feet motion pattern, a ZMP trajectory, a trunk motion pattern, an upper limbs motion pattern and other patterns, which can be arbitrarily selected. The ZMP as used herein refers to a point where the sole of one of the feet of the robot is rigidly secured to the floor without generating any moment when the robot is walking.

In the case of the bipedal ambulatory robot, each of whose legs has six degrees of freedom (see FIG. 3), the attitude of the legs is unequivocally defined by the positions of the feet 22R/L and the horizontal position and the height of the loins. Therefore, the generation of the loins motion pattern is in fact the selection of the attitude of the legs, or the "gait" of the lower limbs (the term "gait" as used herein is a technical term of the industry referring to "time series changes of the angles of joints" and having a meaning substantially same as "pattern of movement").

Figure 6:
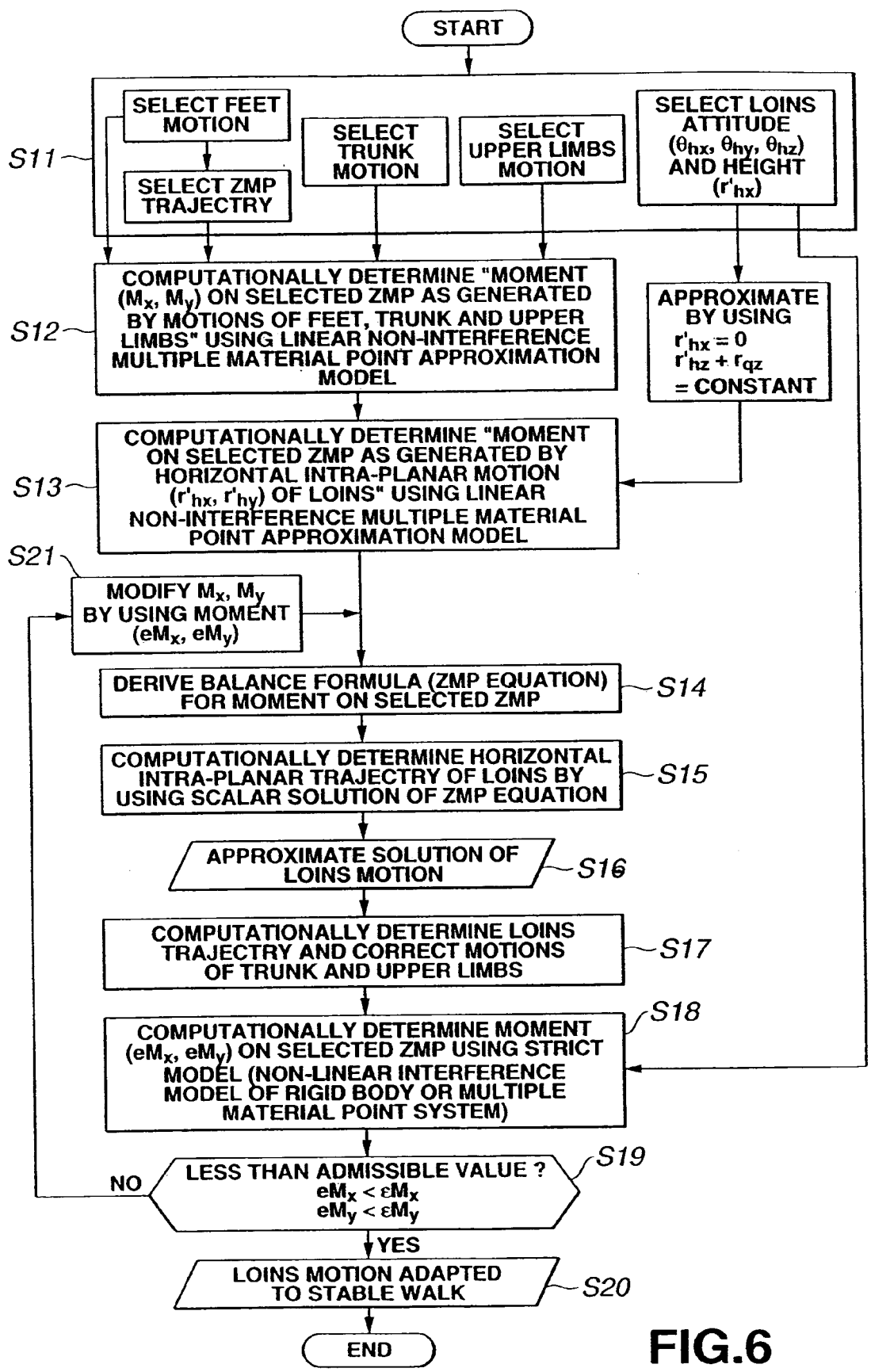
FIG. 6 is a flow chart of a sequence of operation for controlling the walk of a humanoid robot 100 according to the invention.

FIG. 6 is a flow chart of a sequence of operation for controlling the walk of a humanoid robot 100 according to the invention. Note that the motion and the position of each of the joints of the robot 100 are described hereinafter by using the linear and non-interference multiple material point approximation model of FIG. 5 and the following parameters as listed below. Note that the symbols with a Dash (') describe the moving coordinate system.

[Mathematical Expressions 1]

$m_h$: mass of the material point of the loins $\bar{r}_h'$ ($r'_{hx}, r'_{hy}, r'_{hz}$): position vector of the material point of the loins $M_i$: mass of the i-th material point $\bar{r}_i'$: position vector of the i-th material point $\bar{r}'_{zmp}$: position vector of the ZMP $\bar{g}(g_x, g_y, g_z)$: gravity acceleration vector O'-X'Y'Z': moving coordinate system (that moves with the robot)

O-XYZ: absolute coordinate system $$H = \dot{r}_{hz} + r_{qz}$$

It is assumed that the loins of the robot 100 shows a constant height ($r'_{hz} + r_{qz}$=constant) and the material point of each of the knees is equal to zero.

The sequence of operation of FIG. 6 starts when a user command is input for an action of the robot 100, which may be a walking motion or a gesture. The action of the robot 100 as directed by the user command may be a gesture using the upper limbs and the trunk when the robot is standing upright, a walk on the two feet or a gesture using the upper limbs and the trunk when the robot is walking on the two feet to name a few.

Such a user command is interpreted by the main control section 81 and patterns to determine the conditions and the motion of each of the components including the ZMP trajectory, the motion of the trunk, the motion of the upper limbs and the attitude and the height of the loins as derived from the motion of the feet (the soles to be more accurate) and that of the legs (Step S11). More specifically, the pattern of movement of the feet, the trajectory of the ZMP, the pattern of movement of the trunk and that of the upper limbs are selected. Note that the motion of the loins is selected only in terms of the Z' direction and left unknown in terms of the X' and Y' directions.

Then, the moment around the pitching axis and the one around the rolling axis ($M_x$, $M_y$) on the selected ZMP that will be generated as a result of the motions of the feet, the trunk and the upper limbs are computationally determined by using the linear and non-interference multiple material point approximation model (Step S12).

Then, the moment on the selected ZMP that will be generated as a result of the horizontal plane motion of the loins ($r'_{hx}$, $r'_{hy}$) is computationally determined also by using the linear and non-interference multiple material point approximation model (Step S13).

Thereafter, the balancing formula for the moments on the selected ZMP are derived on the moving coordinate system O'-X'Y'Z' that moves with the robot (Step S14). More specifically, the moments ($M_x$, $M_y$) generated as a result of the motions of the feet, the trunk and the upper limbs are used at the right side as terms of known variables and the terms on the horizontal plane motion of the loins ($r_{hx}$, $r_{hy}$) are placed at the left side as terms of unknown variables to derive a linear and non-interference ZMP equation (1) below.

[mathematical expression 2]

$$+ m_h H(\ddot{r}_{hx} + \ddot{r}_{qx} + g_x) - m_h g_2(r'_{hx} - r'_{zmp_x}) = -M_y(t)$$
$$- m_h H(\ddot{r}_{hy} + \ddot{r}_{qy} + g_x) - m_h g_2(r'_{hy} - r'_{zmp_y}) = -M_x(t)$$

(1)

Note, however, it is assumed that the following equations hold true.

$$\ddot{r}_{hz} = 0$$ [Mathematical Expression 3]

$r'_{hz} + r_{qz}$ = constant (in terms of time)

Then, the horizontal plane trajectory of the loins is computationally determined by solving the ZMP equation (1) (Step S15). For example, the ZMP equation (1) can be solved by using a known method such as Euler's method or a Runge/Kutta method to obtain the numerical solution for the horizontal absolute position ($r_{hx}$, $r_{hy}$) of the loins as represented by the unknown variables (Step S16). The numerical solution obtained here is an approximate solution for the motion pattern of the loins that allows the robot to walk in a stable manner, which represents the horizontal absolute position of the loins that allows the ZMP to get to the target position. The target position of the ZMP is normally selected on the sole when the latter touches the floor.

If the preselected motions of the trunk and the upper limbs cannot be realized by the computationally obtained approximate solution, the patterns of motion of the trunk and the upper limbs are selected again or modified (Step S17). At this time the trajectory of each of the knees may also be computationally determined.

Then, the pattern of movement of the entire body obtained in a manner as described above is used for substitution in order to computationally determine the moments ($eM_x$, $eM_y$) on the selected ZMP of the strict model (comprising a rigid body or a large number of material points of the robot 100) (Step S18). While it is assumed that the equations of [mathematical expression 3] hold true for the non-strict model, the strict model does not require such an assumption (and hence the latter equation does not need to be constant in terms of time).

The moments ($eM_x$, $eM_y$) of the strict model represent the errors in the moments generated as a result of the motion of the loins. Then, in the next step of Step S19, it is determined if the moments ($eM_x$, $eM_y$) are less than the respective admissible values ($\epsilon M_x$, $\epsilon M_y$) of the approximate moments of the non-strict model or not. If they are less than the respective admissible values, it means that the strict solution is obtained for the pattern of stable motion of the loins and hence a pattern of movement of the entire body can be obtained for a stable walk of the robot (Step S20) so that the processing routine is terminated.

If, on the other hand, the moments ($eM_x$, $eM_y$) are not less than the respective admissible values ($\epsilon M_x$, $\epsilon M_y$) of the approximate moments of the non-strict model, the generated moments of the approximation model are modified by using the moments ($eM_x$, $eM_y$) of the strict model (Step S21) to derive a linear and non-interference ZMP equation once again. The above computational determination of the approximate solution of the pattern of movement of the loins and the subsequent modification will be repeated until the moments are found to be less than the respective admissible values.

In short, with the sequence of operation of FIG. 6, a motion of the loins adapted to a stable walk can be realized in addition to that of the feet on the basis of the selected patterns of motion of the trunk and the upper limbs. The motion of the trunk and that of the upper limbs correspond to the action including a gesture, or the gait, of the upper body half of the robot 100. Since the attitude of the legs or the "gait" of the lower limbs is unequivocally defined by the positions of the feet 22R/L and the horizontal position and the height of the loins in the case of a bipedal ambulatory robot 100 having six degrees of freedom at each of the legs (see FIG. 3), the generation of the pattern of movement of the loins means that the "gait" of the lower limbs is determined.

Thus, with the bipedal ambulatory robot 100 adapted to erect bipedalism of this embodiment, it is possible to determine the gait of the lower limbs good for a stable walk regardless if the robot is standing upright or walking on the two feet.

Particularly, when the robot 100 is made to gesture by using the upper limbs and the trunk while it is standing upright, it is possible to determine the gait of the lower limbs adapted to a stable walk that follows (and correct the unbalanced condition of the upper body half). In other words, the stability of attitude that is lost by the gesture where the upper body half takes a major role can be appropriately recovered by determining a gait that is defined in terms of the horizontal position of the loins.

Figure 7:
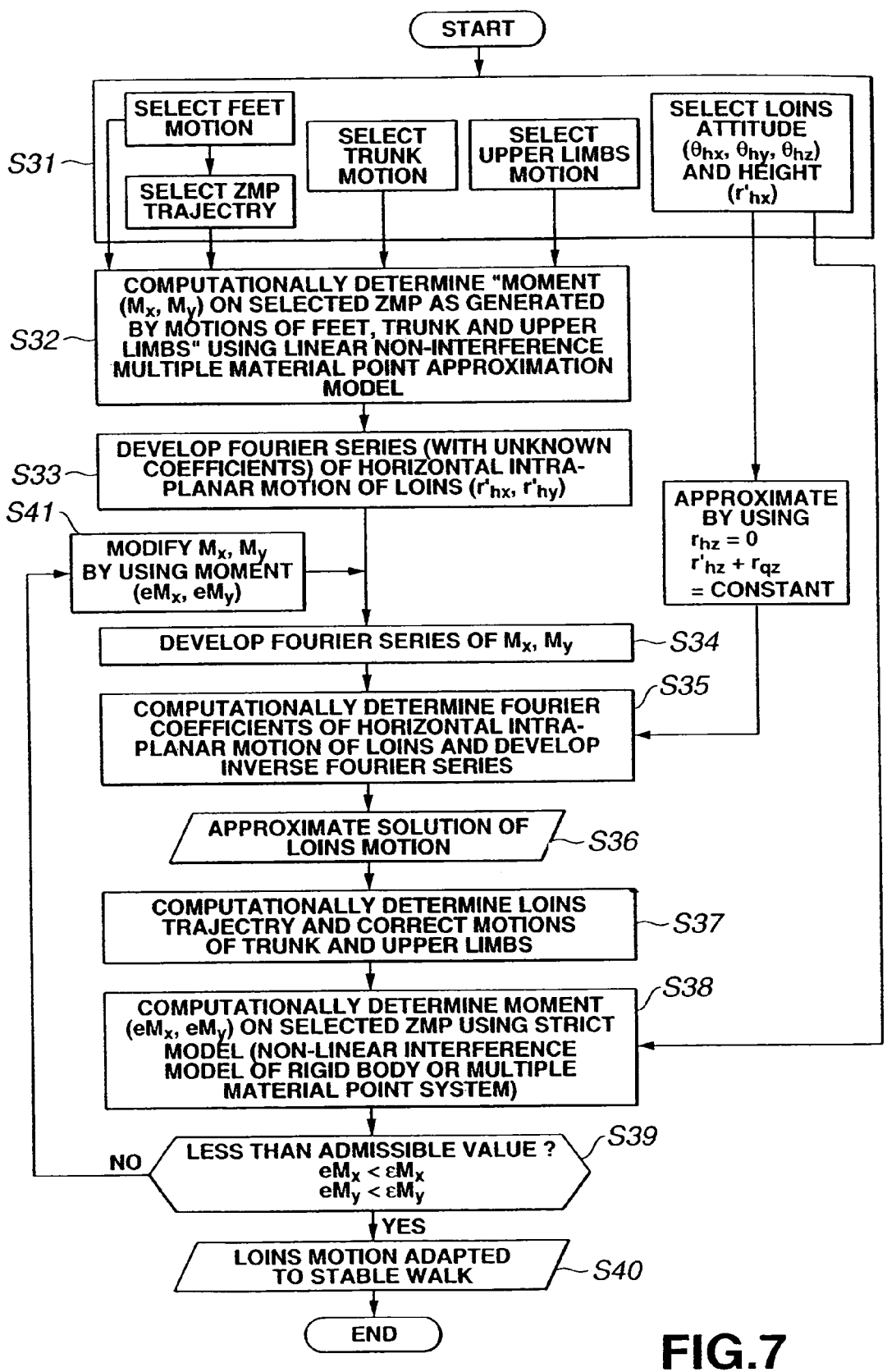
FIG. 7 is a flow chart of another sequence of operation for controlling the motion of the loins adapted to stable walk of a humanoid robot 100 according to the invention.

FIG. 7 is a flow chart of another sequence of operation for controlling the motion of the loins adapted to stable walk of a humanoid robot 100 according to the invention. Note that the motion and the position of each of the joints of the robot 100 are also described hereinafter by using a linear and non-interference multiple material point approximation model.

The sequence of operation of FIG. 7 starts when a user command is input for an action of the robot 100, which may be a walking motion or a gesture. The action of the robot 100 as directed by the user command may be a gesture using the upper limbs and the trunk when the robot is standing upright, a walk on the two feet or a gesture using the upper limbs and the trunk when the robot is walking on the two feet to name a few.

Such a user command is interpreted by the main control section 81 and patterns to determine the conditions and the motion of each of the components including the ZMP trajectory, the motion of the trunk, the motion of the upper limbs and the attitude and the height of the loins as derived from the motion of the feet (the soles to be more accurate) and that of the legs (Step S31). More specifically, the pattern of movement of the feet, the trajectory of the ZMP, the pattern of movement of the trunk and that of the upper limbs are selected. Note that the motion of the loins is selected only in terms of the Z' direction and left unknown in terms of the X' and Y' directions.

Then, the moment around the pitching axis and the one around the rolling axis ($M_x$, $M_y$) on the selected ZMP that will be generated as a result of the motions of the feet, the trunk and the upper limbs are computationally determined by using the linear and non-interference multiple material point approximation model (refer to the above description and FIG. 5) (Step S32).

Then, the horizontal plane motion of the loins ($r'_{hx}$, $r'_{hy}$) is subjected to a Fourier series development (Step S33). As is well known to those who are skilled in the art, the time axis component can be replaced by a frequency component as a result of the Fourier series development. In other words, the motion of the loins can be expressed as a periodical movement. Additionally, the computational speed of this embodiment can be remarkably raised because FFT (Fast Fourier Transform) can be applied.

Then, the moments ($M_x$, $M_y$) around the pitching axis and the rolling axis on the selected ZMP are also subjected to a Fourier series development (Step S34).

Then, the Fourier coefficients of the horizontal plane trajectory of the loins are determined and an inverse Fourier series development is carried out (Step S35) to obtain an approximate solution of the motion of the loins (Step S36). The numerical solution obtained here is an approximate solution for the pattern of movement of the loins that allows the robot to walk in a stable manner, which represents the horizontal absolute position of the loins that allows the ZMP to get to the target position. The target position of the ZMP is normally selected on the sole when the latter touches the floor.

If the preselected motions of the trunk and the upper limbs cannot be realized by the computationally obtained approximate solution, the patterns of motion of the trunk and the upper limbs are selected again or modified (Step S37). At this time the trajectory of each of the knees may also be computationally determined.

Then, the pattern of movement of the entire body obtained in a manner as described above is used for substitution in order to computationally determine the moments ($eM_x$, $eM_y$) on the selected ZMP of the strict model (comprising a rigid body or a large number of material points of the robot 100) (Step S38). While it is assumed that the equations of [mathematical expression 3] hold true for the non-strict model, the strict model does not require such an assumption (and hence the latter equation does not need to be constant in terms of time).

The moments ($eM_x$, $eM_y$) of the strict model represent the errors in the moments generated as a result of the motion of the loins. Then, in the next step of Step S39, it is determined if the moments ($eM_x$, $eM_y$) are less than the respective admissible values ($\epsilon M_x$, $\epsilon M_y$) of the approximate moments of the non-strict model or not. If they are less than the respective admissible values, it means that the strict solution is obtained for the pattern of stable motion of the loins and hence a pattern of movement of the entire body can be obtained for a stable walk of the robot (Step S40) so that the processing routine is terminated.

If, on the other hand, the moments ($eM_x$, $eM_y$) are not less than the respective admissible values ($\epsilon M_x$, $\epsilon M_y$) of the approximate moments of the non-strict model, the generated moments of the approximation model are modified by using the moments ($eM_x$, $eM_y$) of the strict model (Step S41) to carry out a Fourier series development once again. The above computational determination of the approximate solution of the pattern of movement of the loins and the subsequent modification will be repeated until the moments are found to be less than the respective admissible values.

It may be clear to those who are skilled in the art that a motion of the loins adapted to a stable walk can be realized by following the sequence of operation of FIG. 7. Particularly, a periodical motion can be defined quickly by using a Fourier series development without relying of the method of obtaining numerical solutions of a ZMP equation. Additionally, the computational speed can be remarkably raised by applying FFT (Fast Fourier Transform).

The motion of the trunk and that of the upper limbs correspond to the action including a gesture, or the gait, of the upper body half of the robot 100. Since the attitude of the legs or the "gait" of the lower limbs is unequivocally defined by the positions of the feet 22R/L and the horizontal position and the height of the loins in the case of a bipedal ambulatory robot 100 having six degrees of freedom at each of the legs (see FIG. 3), the generation of the pattern of movement of the loins means that the "gait" of the lower limbs is determined.

Thus, with the bipedal ambulatory robot 100 adapted to erect bipedalism of this embodiment, it is possible to determine the gait of the lower limbs good for a stable walk regardless if the robot is standing upright or walking on the two feet.

Particularly, when the robot 100 is made to gesture by using the upper limbs and the trunk while it is standing upright, it is possible to determine the gait of the lower limbs adapted to a stable walk that follows. In other words, the stability of attitude that is lost by the gesture where the upper body half takes a major role can be appropriately recovered by determining a gait that is defined in terms of the horizontal position of the loins.

[Annex]

The present invention is described in detail by way of specific embodiments. However, it may be clear to those skilled in the art that the above embodiments can be modified and/or altered without departing from the scope of the invention.

While that attitude ($\theta_{hx}$, $\theta_{hy}$, $\theta_{hz}$) of the loins of the robot is expressed above in terms of three degrees of freedom of the trunk pitching axis 5, the trunk rolling axis 6 and the trunk yawing axis 7, the position of the loins of a humanoid robot 100 may be handled in various different ways by referring to the bodily mechanism of an actual bipedal ambulatory animal adapted to erect bipedalism such as man or ape.

Additionally, the present invention is not limited to manufacturing products that are called as "robot". In other words, the present invention is applicable to products of various industries such as toy industry so long as the products are mechanical apparatus that mimic the behaviour of man by means of electric and/or magnetic effects.

In short, the present invention is described in terms of specific embodiments only to make it clearly understood and therefore the above embodiments by no means limit the scope of the invention. The scope of the present invention is defined only by the appended claims.

Figure 9:
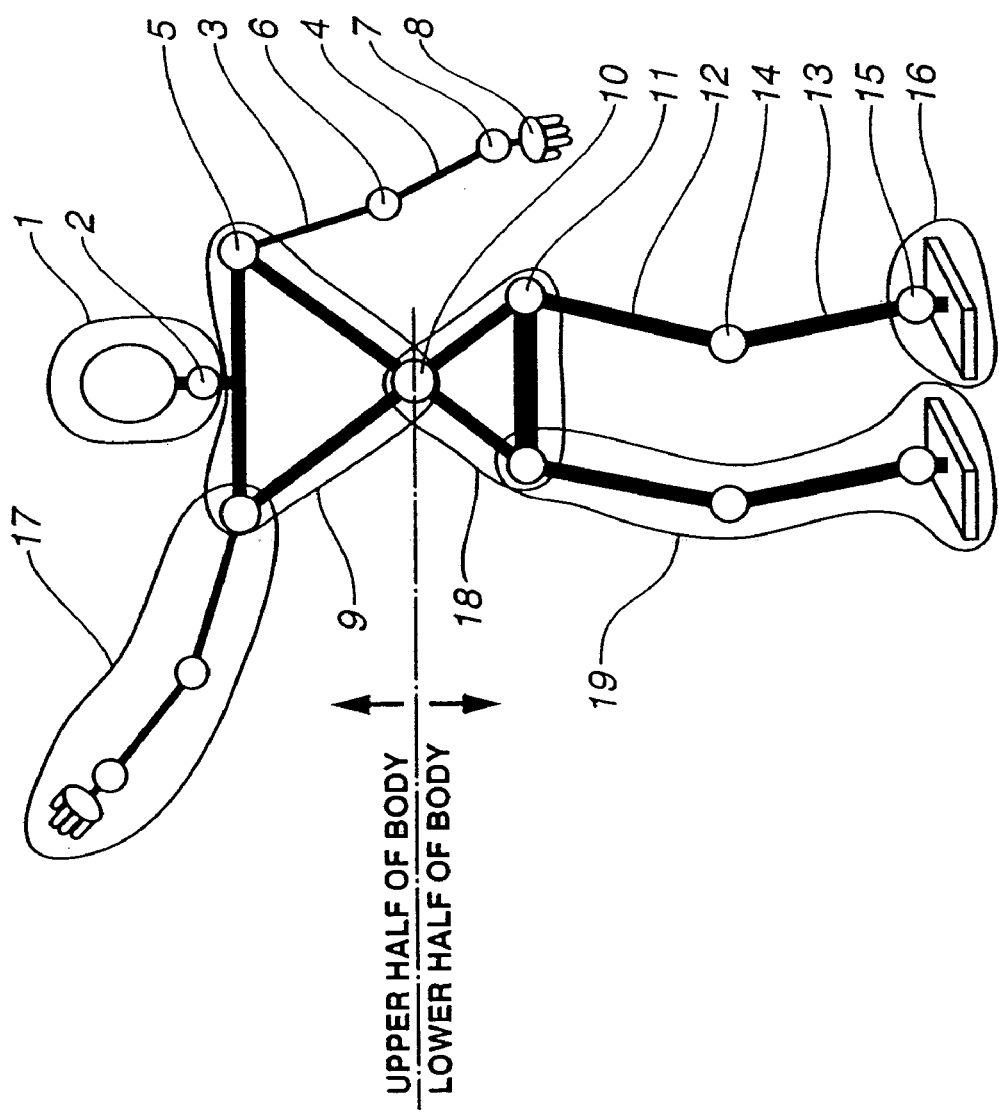
FIG. 9 is a schematic illustration of a humanoid robot, showing the configuration of its joint model.

For the purpose of better understanding of the present invention, the configuration of a joint model that can be used for humanoid robots is illustrated in FIG. 9. Referring to FIG. 9, the part of the robot covering the shoulder joints 5, the upper arms 3, the elbow joints 6, the forearms 4, the wrist joints 7 and the hands 8 are referred to as "upper limbs" 17. The part of the robot extending from the hip joints 11 to the trunk joint 10 is referred to as "trunk" 18. The trunk joint 10 has the role of expressing the degrees of freedom of the spine of man. Finally, the part of the robot covering the hip joints 11, the thighs 12, the knee joints 14, the shanks 13, the ankle joints 15 and the feet 16 are referred to as "lower limbs" 19. More roughly, the part from-the-trunk-joint above is called "upper body half" while the remaining part is called "lower body half".

Figure 10:
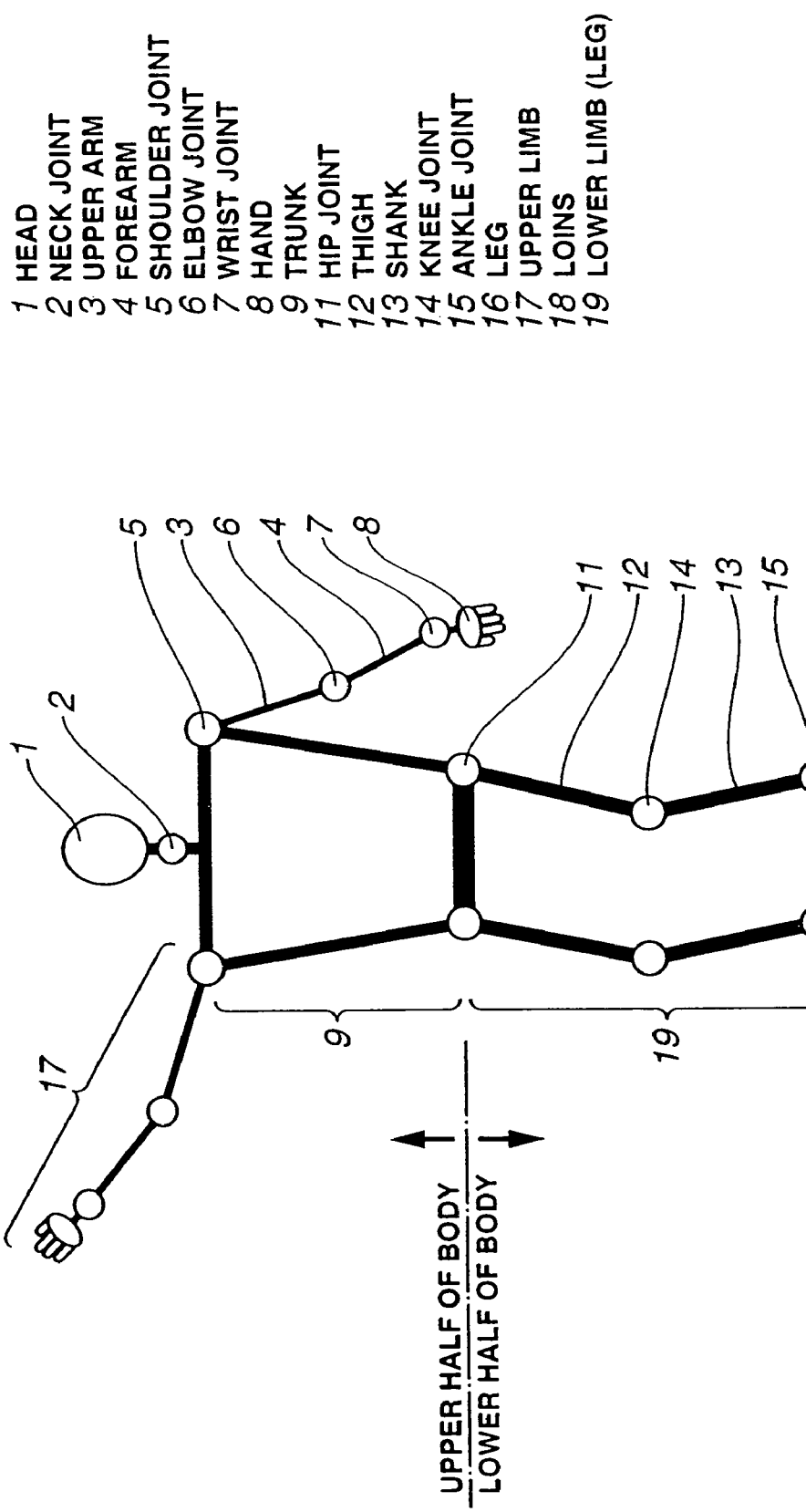
FIG. 10 is a schematic illustration of another humanoid robot, showing the configuration of its joint model.

FIG. 10 is a schematic illustration of another joint model that can be used for humanoid robots. This model differs from that of FIG. 9 in that it does not comprise a trunk joint 10. Refer to the above description for the denominations of the various components. The lack of a trunk joint that corresponds to the spine of man make the upper body half of the humanoid robot less rich in expressions. However, such a robot may find application in dangerous works and other works in industries where the motion of the upper body half is not particularly important. Note that the reference numerals of FIGS. 9 and 10 do not agree with those used in the other drawings.

The invention claimed is:

1. A control apparatus for controlling a robot to walk, the robot having an upper body half provided with a plurality of joints for expressing an action of the upper body half and a lower body half having leg joints at least for realizing an ambulatory action, said control apparatus comprising:
   a processor to compute moments generated as a result of an upper body gesture; and
   means for obtaining a solution for lower body motion as a function of said computed moments such that the lower body half has a gait that is adapted to walk in a stable manner according to the gait of the upper body half.

2. An ambulation control method for controlling a robot having an upper body half provided with a plurality of joints for expressing an action of the upper body half and a lower body half having leg joints at least for realizing an ambulatory action, said method comprising the steps of:
   computing moments generated as a result of an upper body gesture; and
   obtaining a solution for lower body motion as a function of the computed moments for controlling at least one of said leg joints, such that the lower body half exhibits a gait that is adapted to walk in a stable fashion according to the gait of the upper body half.

3. A motion pattern generator apparatus of a robot which comprises at least upper limbs, lower limbs, a trunk and loins, comprising:
   means for obtaining a solution for lower body motion as a function of a motion pattern of the upper limbs resulting from an upper body gesture, optionally one or more of a motion pattern of the feet of the robot, a trajectory of zero moment point (ZMP) of the robot, and a motion pattern of the trunk of the robot; and
   means for generating a motion pattern of the body of the robot based on the obtained solution for the motion of the loins.

4. A motion pattern generator apparatus of a robot which comprises an upper body half having movable upper limbs and a lower body half connected to the upper body half having movable lower limbs, comprising:
   means for setting a motion pattern, that includes an upper body gesture, of the upper body half;
   means for setting a trajectory of a zero moment point (ZMP) on the basis of the set motion of the upper body half and upper body gesture;
   means for obtaining a solution for a motion of the lower body half for balancing a moment on the set ZMP trajectory;
   means for setting a motion pattern of the lower body half based on the obtained solution; and
   control means for controlling a motion of the robot apparatus based on the motion of the upper body half and the motion of the lower body half.

5. A robot apparatus comprising:
   an upper body half which has movable upper limbs;
   a lower body half connected to the upper body half, which has movable lower limbs;
   means for setting a motion pattern, that includes an upper body gesture, of the upper body half;
   means for setting a trajectory of a zero moment point (ZMP) on the basis of the set motion of the upper body half and the upper body gesure;
   means for obtaining a solution for a motion of the lower body half for balancing a moment on the set ZMP trajectory;
   means for setting a motion pattern of the lower body half based on the obtained solution; and
   control means for controlling a motion of the robot apparatus based on the motion of the upper body half and the motion of the lower body half.

6. A method for controlling a robot having an upper body half which has movable upper limbs and a lower body half connected to the upper body half, which has movable lower limbs, said method comprising the steps of:
   step for setting a motion pattern, that includes an upper body gesture, of the upper body half;
   step for setting a trajectory of a zero moment point (ZMP) on the basis of the set motion of the upper body half and the upper body gesture;
   step for obtaining a solution for a motion of the lower body half for balancing a moment on the set ZMP trajectory;
   step for setting a motion of the lower body half based on the obtained solution; and
   step for controlling a motion of the robot apparatus based on the motion of the upper body half and the motion of the lower body half.

7. A motion pattern generator apparatus of a robot, comprising:
   means for setting a motion of feet, motion of a trunk, motion of upper limbs and attitude and height of loins of the robot to generate a requested motion;
   means for setting a trajectory of a zero moment point (ZMP) on the basis of the set motion of the feet, the trunk, and the upper limbs;
   means for obtaining a motion of the loins for balancing a moment on the set ZMP trajectory;
   means for generating a motion pattern of the entire body of the robot based on the motion of the loins.

* * * * *